Figure 1:
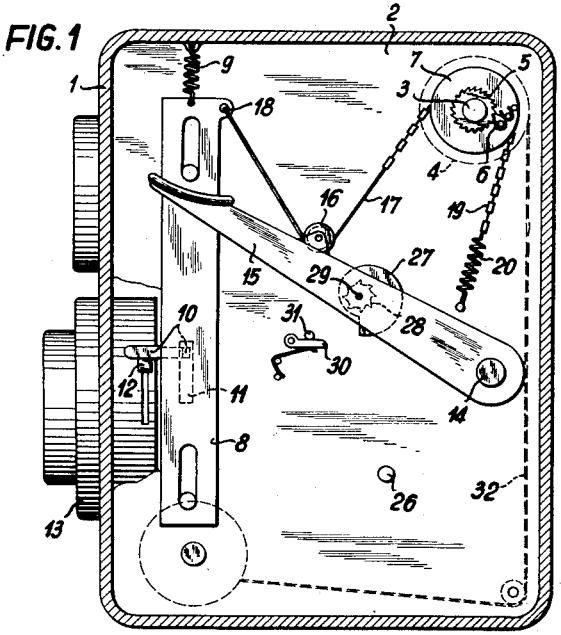

INVENTOR
FRITZ FAULHABER

BY

ATTORNEYS

United States Patent Office 2,791,164
Patented May 7, 1957

2,791,164

DEVICE FOR TRANSPORTING THE FILM AND SETTING THE SHUTTER IN PHOTOGRAPHIC CAMERAS

Fritz Faulhaber, Schonaich, Wurttemberg, Bezirk Boblingen, Germany, assignor to Voigtlander Aktiengesellschaft, Braunschweig, Germany, a corporation of Germany Application May 27, 1955, Serial No. 511,739

Claims priority, application Germany June 5, 1954

8 Claims. (Cl. 95—31)

This invention relates to a device for advancing the film and setting the shutter in photographic cameras.

It has been known to use film advancing mechanisms, in which the stroke of the control member changes in dependence on the increasing diameter of the film wound up on the take-up spool during movement of the film. If in such known devices, simultaneously with the transport of the film, the shutter of the camera should also be set, difficulties are caused by the necessarily varying stroke ratio which changes continuously.

The main object of the present invention is to provide such a device for the combined job of the film transport and setting of the shutter.

In order to attain this object, according to the invention a so-called equipartition mechanism is used. The latter preferably consists of a drawing or tension member, one end of which is connected with the shutter setting member or a member connected therewith, while its other end is fastened to a drum directly or indirectly connected with the film take-up spool. For example, the drawing member connected at its ends to the beforementioned elements to be actuated, is engaged at its middle portion on the rope or cable by a control member by means of a roller or a gliding member. Thereby, that part of the control member which is in engagement with the rope or cable is movable in a right angle or a component located in a right angle thereto, relative to an imaginary connecting line between the ends of the rope.

The end of the drawing member which moves the take-up spool, can be connected over a spring with the camera body proper, if by suitable spring tension or several windings around the rope or cable drum and film take-up spool, a sufficient friction connection between the drawing member and the film take-up spool is provided for.

According to a modified arrangement, the control member engages the drawing member at one of its free ends, whereby the latter is conducted over a roller arranged on the shutter setting member, and is connected at the other end with a winding drum part of the film take-up spool.

The use of chain drives and rope drives has been previously known in the construction of photographic cameras. Up to now these drawing means have been used for the transmission of traction forces only. However, the use of a rope drive according to the present invention in a combined shutter setting and film transporting device is novel and results in an original improvement. Moreover in this use the beforementioned novel function and effect are obtained.

The appended drawings diagrammatically illustrate by way of example some embodiments of the invention, to which the invention is not limited.

In the drawings, Figure 1 is a side view of a photographic camera, with a side wall being cut open in order to show a rope drive which is provided between the shutter setting means and the film transport as well as an operating handle and in which the two ends of the rope are connected with the camera parts to be displaced.

Figure 2:
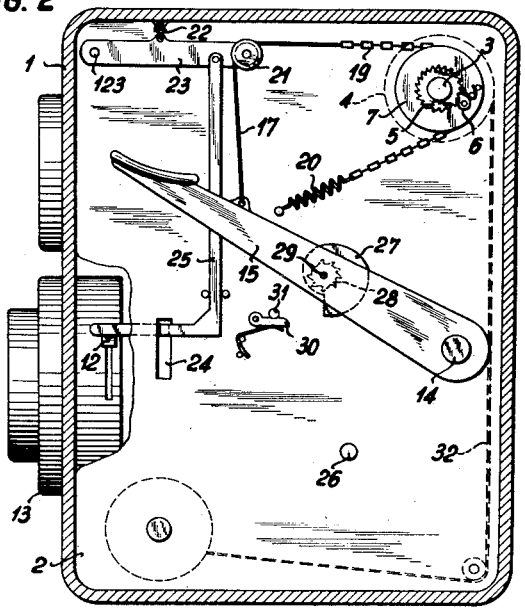

Figure 2 is a similar view of a rope drive which is arranged between a control member and the shutter setting means as well as the film transport and in which the control member is fixedly connected with one end of the rope.

Referring now to the drawings in detail, reference numeral 1 denotes the casing of a twin lens reflex camera, and 2 denotes a partition on which the arrangement according to the invention is shown. The shaft 3 of film take-up spool 4 carries on its front end a toothed ratchet wheel 5, which co-acts with a pawl 6, the latter being arranged on a winding drum part 7 which is coaxial with shaft 3 of the film spool and is freely rotatable in the camera casing.

Reference symbol 8 denotes a slide which is vertically movable in the camera and is under the effect of a return spring 9 which pulls it toward the upper side of the camera. A transmission angle arm 10, which is fastened to the slide 8, passes through a slot 11 of partition 2 and is in connection at its free end with the conventional setting lever 12 of the shutter 13. A swingable control member 15 is pivoted at 14 in the camera and carries a loosely rotatable roller 16. Under this roller 16 a rope 17 passes, one end of which is fastened to slide 8 at 18, while its other end which may continue, for example, as a chain 19 is passed around winding drum part 7 in frictional connection and is connected over a tension spring 20 with the camera body.

Figure 2 illustrates a somewhat modified embodiment of the rope drive. Reference numeral 7 denotes here again the winding drum part. From the latter the drawing member 19, 17 passes over a loosely rotatable roller 21, which is pivoted on a swingable member 23, which latter is under the effect of a return spring 22. This member 23 is swingable about pin 123. The other end of the drawing member 17 is connected with control member 15. Member 23 is connected over a double-angled linkage 25 with the shutter setting lever 12. Said linkage passes through a slot 24 of partition 2.

In both of the above described arrangements of the rope drive, the control movement derived from a single control member, is branched off, i. e. transmitted to the shutter setting member 12 as well as the film take-up spool 4. The branching arrangement is thereby of such character that at premature arrest, or arrival of one of the parts to be moved at its end stop, the other part to be moved is nevertheless further displaced. This renders it possible to manufacture these constructions from inexpensive elements having large tolerances.

Operation of that part of the device which effects setting of the shutter, will be easily understood from the above description. Transport of the film takes place in both cases, in the same way, over winding drum part 7 which is driven by the pulled down drawing means 17, 19, whereby said part 7 transmits its rotation over the one way coupling 6, 5, to the film take up spool 4. The stroke of the control member 15, which is necessary for effecting the advance step of the film, is limited by stop 26, which is stationary in the camera casing.

In order to take into consideration the increase of the diameter of the wound up film, the following arrangement is used.

An eccentric 27 is arranged on control member 15, said eccentric being fixedly connected with saw-toothed wheel 28. Both parts 27 and 28 are rotatably arranged under braking effect on a common shaft 29. In the swinging path of control member 15, a control latch 30 is located, which is pivoted on partition 2 and is arranged in one direction for movement against a stop 31, which is stationary in the camera casing and in the opposite direction swingable against a spring effect. While upon swinging control member 15, downward, wheel 28, owing to its braked arrangement causes swinging of latch 30, which is under spring effect, and cannot be displaced by the latch, upon moving said member 15 upward, it will be turned by one tooth by latch 30 which is held by stop 31. Thus, eccentric 27 is also turned by a corresponding angle. Therefore, during switching to the next picture it comes to lie against stop 26 with a larger radius whereby the control stroke is terminated earlier and film 32 is advanced by a normal step only, in spite of the increased diameter of the wound film.

It will be understood that this invention is not limited to the constructions, elements, designs, steps and other details specifically described above and shown in the drawings and can be carried out with various modifications without departing from the scope of the invention as defined in the appended claims.

What is claimed is:

1. A device for setting the shutter and advancing the film in a photographic camera, comprising a single traction member, a first portion of which is adapted to bring about setting of the shutter, and a second portion of said traction member, which is spaced from said first portion, and is adapted to bring about operation of the film advancing mechanism; a swingable control member for engaging said single traction member and bringing about in simultaneous control steps setting of the shutter and transport of the film, respectively, upon operation of said control member, by action of the control member on the traction member, whereby upon completion of one of said control steps, the other control step is continued.

2. A device for setting the shutter and advancing the film in a photographic camera, comprising a single traction member, a first portion of which is adapted to bring about setting of the shutter, and a second portion of said traction member, which is spaced from said first portion, and is adapted to bring about operation of the film advancing mechanism; a swingable control member for engaging said single traction member and bringing about in simultaneous control steps setting of the shutter and transport of the film, respectively, upon operation of said control member, by action of the control member on the traction member, whereby upon completion of one of said control steps, the other control step is continued; one end of the traction member being connected with a slide which is connected with the setting element of the shutter; the other end of the traction member being fastened to a winding drum connected with the take-up spool for the film; said control member being provided with a roller, which is loosely rotatable thereon, for acting on a middle portion of the traction member which extends between said slide and winding drum.

3. A device for setting the shutter and advancing the film in a photographic camera, comprising a single traction member, a first portion of which is adapted to bring about setting of the shutter, and a second portion of said traction member, which is spaced from said first portion, and is adapted to bring about operation of the film advancing mechanism; a swingable control member for engaging said single traction member and bringing about in simultaneous control steps setting of the shutter and transport of the film, respectively, upon operation of said control member, by action of the control member on the traction member, whereby upon completion of one of said control steps, the other control step is continued; one end of the traction member comprising a rope fastened by winding around a winding drum connected with the take-up spool for the film and the other end of the traction member being fastened to the control member; the traction member extending between the two fastening points being guided at its middle portion over a loose roller which is pivoted on a member connected with the shutter setting lever in such a manner that the roller is movable against the effect of a return spring.

4. A device as claimed in claim 1, in which the control member and the traction member are arranged between a member connected with the shutter setting member and the take up spool for the film.

5. A device as claimed in claim 2, in which the traction member comprises a rope or cable.

6. A device as claimed in claim 2, in which the traction member comprises a chain.

7. A device as claimed in claim 2, in which one end of the traction member is wound up on the winding drum connected with the take up spool for the film and connected with the camera casing over a tension spring.

8. A device as claimed in claim 2, comprising an eccentric and a saw toothed wheel fixedly connected therewith, said eccentric and wheel being arranged on the control member and rotatable under braking effect about a common shaft; a control latch pivotally arranged on a partition of the camera, said control latch being movable in a first direction toward a stationary stop and in the opposite direction against the effect of a spring, in order to cause displacement of the control latch by said wheel against said spring effect upon moving the control member in said opposite direction and to cause rotation of said wheel by the control latch upon moving the control member in said first direction.

References Cited in the file of this patent

UNITED STATES PATENTS

| 791,800 | Laur | June 6, 1905 |
| 2,016,611 | Muller | Oct. 8, 1935 |
| 2,161,941 | Zapp | June 13, 1939 |
| 2,169,548 | Zapp | Aug. 15, 1939 |
| 2,522,214 | Dreisbach | Sept. 12, 1950 |

FOREIGN PATENTS

| 14,927 | Great Britain | of 1893 |